(12) United States Patent
Chen et al.

(10) Patent No.: US 8,644,857 B2
(45) Date of Patent: Feb. 4, 2014

(54) METHOD, DEVICE AND SYSTEM FOR IMPLEMENTING LOCATION-BASED SERVICE

(75) Inventors: Jian Chen, Shenzhen (CN); Xu Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 12/895,246

(22) Filed: Sep. 30, 2010

(65) Prior Publication Data

US 2011/0021212 A1 Jan. 27, 2011

Related U.S. Application Data

(63) Continuation of application No. PCT/CN2009/070978, filed on Mar. 24, 2009.

(30) Foreign Application Priority Data

Apr. 7, 2008 (CN) .......................... 2008 1 0066608

(51) Int. Cl.
- *H04W 24/00* (2009.01)
- *H04M 11/04* (2006.01)
- *H04M 3/42* (2006.01)
- *H04L 29/06* (2006.01)
- *H04L 29/08* (2006.01)

(52) U.S. Cl.
USPC .................. 455/456.3; 455/456.1; 455/404.2; 455/414.1; 455/414.2; 455/414.3; 455/414.4

(58) Field of Classification Search
USPC ............. 455/404.2, 414.1–414.4, 422.1, 433, 455/440, 443, 444, 456.1–457
See application file for complete search history.

(56) References Cited

U.S. PATENT DOCUMENTS

| | | | |
|---|---|---|---|
| 5,802,468 A * | 9/1998 | Gallant et al. | 455/422.1 |
| 6,038,445 A | 3/2000 | Alperovich et al. | |
| 6,052,591 A | 4/2000 | Bhatia | |
| 6,101,387 A * | 8/2000 | Granberg et al. | 455/433 |
| 2001/0006896 A1 | 7/2001 | Yule | |
| 2006/0089152 A1 | 4/2006 | Mahonen | |
| 2006/0135174 A1* | 6/2006 | Kraufvelin et al. | 455/456.1 |
| 2009/0234745 A1* | 9/2009 | Ramer et al. | 705/14.23 |

FOREIGN PATENT DOCUMENTS

| | | |
|---|---|---|
| CN | 1233378 A | 10/1999 |
| CN | 1234168 A | 11/1999 |
| CN | 1286876 A | 3/2001 |
| CN | 1341330 A | 3/2002 |

(Continued)

OTHER PUBLICATIONS

First Chinese Office Action issued in corresponding Chinese Patent Application No. 200810066608.9, mailed Feb. 12, 2010.

(Continued)

*Primary Examiner* — Huy C Ho
(74) *Attorney, Agent, or Firm* — Brinks Gilson & Lione

(57) ABSTRACT

The present disclosure relates to a communication technology and discloses a method, device, and system for implementing a Location-Based Service (LBS). A corresponding particular service area is set for a User Equipment (UE) and services in the particular service area are provided by a corresponding application server. By applying the technical solution provided by the embodiments of the present disclosure, an operator can provide services for particular users in the particular service area, and implement intelligence and personalization to avoid the spread of junk information and to improve user satisfaction.

13 Claims, 4 Drawing Sheets

(56) References Cited

FOREIGN PATENT DOCUMENTS

| CN | 101262495 A | 9/2008 |
|---|---|---|
| EP | 1 874 001 A1 | 1/2008 |
| KR | 20080002144 A | 1/2008 |
| KR | 20080023964 A | 3/2008 |
| WO | WO 00/18156 A1 | 3/2000 |
| WO | WO 2007/009297 A1 | 1/2007 |
| WO | WO 2007/111439 A1 | 4/2007 |
| WO | WO 2009/124478 A1 | 10/2009 |

OTHER PUBLICATIONS

Office Action issued in corresponding PCT Patent Application No. PCT/CN2009/070978, mailed Apr. 30, 2009.
Extended European Search Report issued in correspondence European Application No. 09729728.7, mailed Mar. 7, 2011.
Chinese Patent No. 101262495, issued on Dec. 12, 2012, granted in corresponding Chinese Patent Application No. 200810066608.9.

* cited by examiner

METHOD, DEVICE AND SYSTEM FOR IMPLEMENTING LOCATION-BASED SERVICE

CROSS-REFERENCE TO RELATED APPLICATIONS

This application is a continuation of International Application No. PCT/CN2009/070978, filed on Mar. 24, 2009, which claims priority to Chinese Patent Application No. 200810066608.9, filed on Apr. 7, 2008, both of which are hereby incorporated by reference in their entireties.

FIELD OF THE DISCLOSURE

The present disclosure relates to a communication technology, and in particular, to a method, device, and system for implementing a Location-Based Service (LBS).

BACKGROUND OF THE DISCLOSURE

In a mobile communications network, Location-Based Service (LBS) is an attractive service. The service may include information services, ad services, etc. By applying the technical solution of the present disclosure, operators may provide a service for particular users (defined by user information) in a particular service area at particular time and intelligently provide effective information for particular users in the particular service area at the particular time to avoid the spread of junk information, thus having a wide application prospect.

The Universal Mobile Telecommunications System (UMTS) is the third generation mobile communications system using the Wideband Code Division Multiple Access (WCDMA) air interface technology. The UMTS is also known as the WCDMA communications system.

Certain issues and/or problems have been identified with conventional technologies. Taking the WCDMA system as an example, according to the present protocols, the network cannot find the specific location of a User Equipment (UE) in the idle state, so that the LBS is not feasible. For the UE in the connection state, there is no good solution for the LBS.

However, in the Global System for Mobile communications (GSM), Code Division Multiple Access 2000 (CDMA2000) system, and systems such as Enhanced High-Speed Packet Access (E-HSPA), and Long Term Evolution/System Architecture Evolution (LTE/SAE) of the 3rd Generation Partnership Project (3GPP) in the process of network evolution, similar problems exist, to which no good solution is available in the prior art.

SUMMARY OF THE DISCLOSURE

Embodiments of the present disclosure provide a method, device, and system for implementing the Location-Based Service (LBS) which can provide intelligent services for particular users in a particular service area.

An embodiment of the present disclosure provides a method for implementing the LBS. In the method, a corresponding particular service area is set for a UE and services in the particular service area are provided by a corresponding application server. The method includes receiving current location information of the UE where the current location information is sent when the UE enters the particular service area or when the UE is powered on in the particular service area, determining the particular service area where the UE is currently located according to the current location information of the UE, and starting the service corresponding to the UE according to the particular service area where the UE is currently located.

Another embodiment of the present disclosure further provides a device for implementing the LBS. The device may be an application server and provide services for a UE in a particular service area. The device includes a receiving unit configured to receive current location information of the UE where the current location information is sent when the UE enters the particular service area or when the UE is powered on in the particular service area, a determining unit configured to determine the particular service area where the UE is currently located according to the current location information of the UE received by the receiving unit, and a service unit configured to start the service corresponding to the UE according to the determination result of the determining unit.

Another embodiment of the present disclosure further provides a Mobile Station (MS) in a communications system. The MS includes a Subscriber Identity Module (SIM) card and a UE. Herein, the UE includes a location reporting unit and a request sending unit, and the SIM card includes a setting unit, a determining unit and a commanding unit. The setting unit of the SIM card is configured to set area information of a particular service area for the UE. The location reporting unit of the UE is configured to report current location information of the UE to the SIM card when the UE enters the particular service area or when the UE is powered on in the particular service area. The determining unit of the SIM card is configured to determine whether the UE is located in a cell of the particular service area according to the current location information reported by the UE. The commanding unit of the SIM card is configured to command the UE to send a service request to the application server when the determining unit determines that the UE is located in a cell of the particular service area, and the request sending unit of the UE is configured to send the service request carrying current location information of the UE to the application server after the command of the SIM card is received.

Another embodiment of the present disclosure further provides a system for implementing the LBS. The system includes the above device for implementing the LBS and the MS in the communications system.

According to the technical solution provided by the embodiments of the present disclosure, a corresponding particular service area is set for a UE and services in the particular service area are provided by a corresponding application server. The particular service area where the UE is currently located is determined according to current location information of the UE, and the service corresponding to the UE is started. By applying the technical solution provided by the embodiments of the present disclosure, the operators can provide services for particular users in the particular service area and implement intelligence and personalization to avoid the spread of junk information and to improve user satisfaction.

DETAILED DESCRIPTION OF THE EMBODIMENTS

Figure 1:
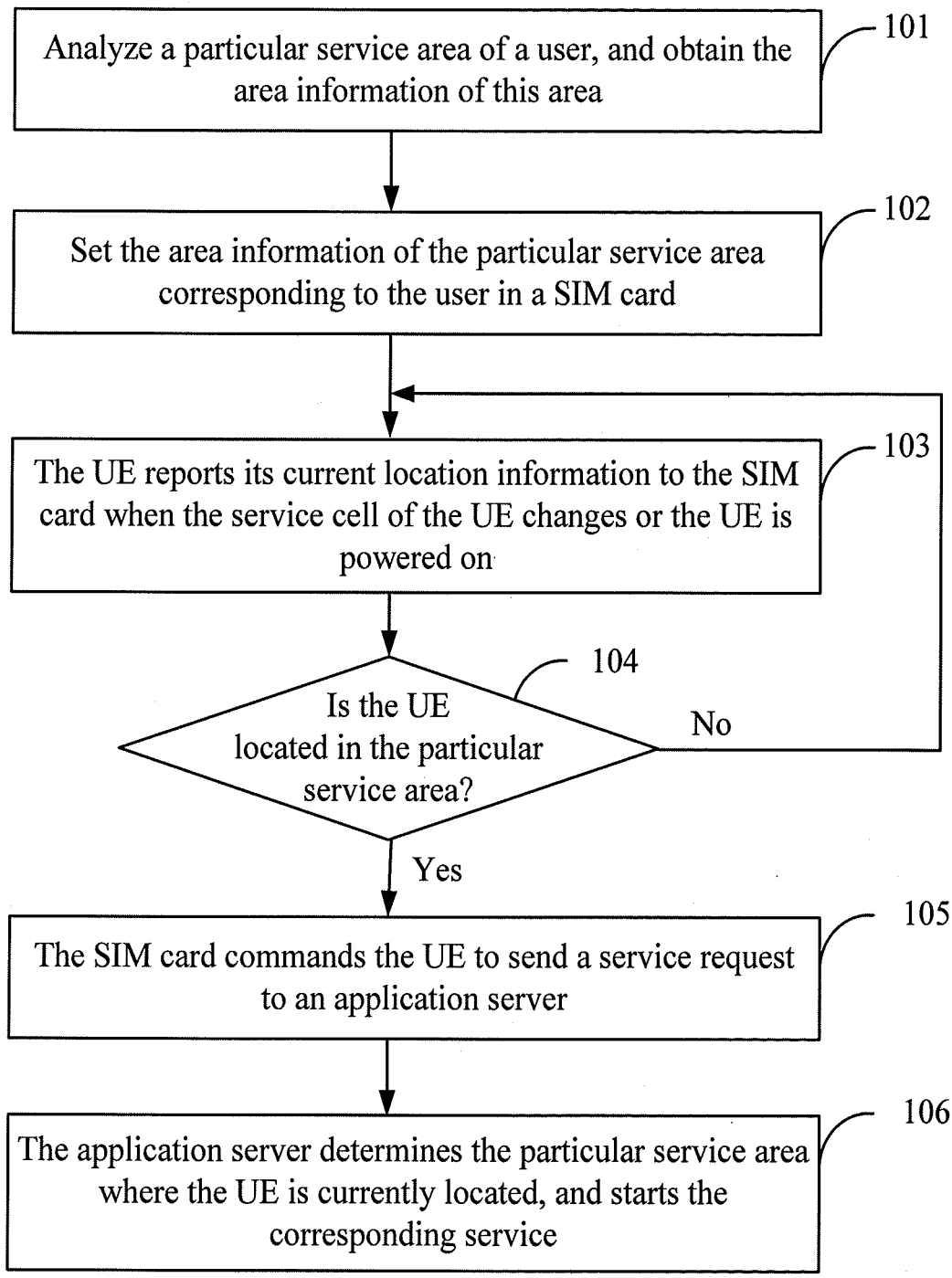
FIG. 1 illustrates a flowchart of a method for implementing the LBS provided by a first embodiment of the present disclosure.

For clearer description of the objective, technical solution and advantages of the present disclosure, the following describes the present disclosure in detail with reference to the accompanying drawings.

In the mobile communications network, a Location-Based Service (LBS) is an attractive service. The service may at least include: (1) information service and (2) entertainment service.

The technical solution provided by the embodiments of the present disclosure is applicable to a User Equipment (UE) operating in the idle state or in the connection state. According to the technical solution provided by the embodiments of the present disclosure, a corresponding particular service area is set for a UE and services in the particular service area are provided by a corresponding application server.

In the embodiments of the present disclosure, assuming that a user and a UE have a one-to-one relation, the particular service area for a user is also the particular service area of the UE corresponding to the user. The specific implementation may be: receiving current location information of the UE, determining the particular service area where the UE is currently located according to the current location information of the UE, and starting the service corresponding to the UE according to the particular service area where the UE is currently located. By applying the technical solution provided by the embodiments of the present disclosure, the operators can provide services for particular users in the particular service area and implement intelligence and personalization to avoid the spread of junk information and to improve user satisfaction.

The technical solutions provided by the embodiments the present disclosure may be implemented by using the toolkit function of a Subscriber Identity Module (SIM) card or by using the location update function directly.

The first group of method embodiments describes the solution implemented based on the toolkit function of the SIM card and explain the solution by taking the UE in the idle state as an example. The toolkit function of the SIM card is briefly described below.

As noted above, "SIM" is the abbreviation of Subscriber Identity Module, also known as a User Identity Module (UIM). It will be appreciated that the name of the SIM card may possibly be different in different systems. For example, in the UMTS system, the name is UMTS Subscriber Identity Module (USIM card). In the embodiments of the present disclosure, all the USIM cards with similar functions are referred to as SIM cards for short. The SIM card may store the information of a user and may be provided to the communications network for user identification. In general, a SIM card uniquely identifies a user, so that the communications fee generated is automatically recorded on the account of the user associated with the SIM card. The SIM card is very important for users. For example, the MS of a GSM/UMTS system can be used only after the SIM card is installed.

The value added service toolkit (SIM card Toolkit, STK) of the SIM card is a group of specific instruction formats for the interactive operation between the SIM card and the UE (the UE and the SIM card can be regarded as two independent processor systems). The 3GPP defines the commands of the toolkit to implement the plentiful service functions through the toolkit interface. The toolkit commands may be classified into commands initiated by the user and commands initiated by the SIM card. The commands initiated by the SIM card are herein referred to as proactive commands. The SIM card with the toolkit function is called an STK card (the early SIM cards do not support the toolkit function).

First Embodiment

FIG. 1 illustrates a flowchart of a method for implementing the LBS provided by the first embodiment of the present disclosure. As illustrated in FIG. 1, the method of the first embodiment includes the following steps:

Step 101: Analyze the particular service area of the user and obtain the area information of this area.

In the embodiment, the areas where services need to be provided for the particular user should be analyzed first. The specific way may be: analyzing the particular service area of the user and obtaining the area information of this area.

The specific way above may be completed by the operators during the early stage of network construction or the network operation according to the actual requirements. The specific way may be: analyzing a cell covering the particular service area of the particular user and obtaining a Cell ID (if the particular service area is covered by a cell) or a Cell Group ID (if the particular service area is covered by multiple cells) of this area. In this case, the area information of the particular service area is the Cell ID or the Cell Group ID. In addition, besides the information element (IE) of Cell ID, the location information may further include additional information elements such as Mobile Country Code (MCC), Mobile Network Code (MNC) and/or Location Area Code (LAC). Therefore, during the utilization of the technical solutions provided by the embodiments of the present disclosure, whether the area information of the particular service area further needs to include at least one of the MCC, MNC, and/or LAC may be determined according to the specific circumstances of the operators that are necessary to uniquely confirm the particular service area.

It will be appreciated that the particular service area is intended for the particular user (including a single user or a user group) to whom the corresponding services may be provided in different areas. The particular service area may be called the particular service area of the particular user. For example, for user 1, a supermarket and a small commodity market are regarded as the particular service area, namely, the particular service area of user 1. For user 2, an electronic product expo and a high-tech exhibition hall are regarded as the particular service area, namely, the particular service area of user 2 And for user 3, a cinema and a theater are regarded as the particular service area, namely, the particular service area of user 3.

As mentioned above, the LBS may include at least the information service and entertainment service. The information service and entertainment service may be further classified. For users, the different services selected possibly correspond to different respective cells. On the other hand, because the cell range is larger, the different services may correspond to the same cell.

Step 102: Set the area information of the particular service area corresponding to the user in the SIM card.

In the particular service area corresponding to the user, a particular service is provided for the user.

Corresponding to step 101, which IEs about the location need to be included in the area information stored in the SIM card is determined according to the specific circumstances of the operators. For example, only setting the Cell ID, or at least one of other IEs is needed. The following explanation only takes the setting of the Cell ID as an example, but is not limited to this.

The specific way of setting the area information in the SIM card may be:

(1) For a new SIM card, the area information is pre-configured and stored in the SIM card. Taking user 1 as an example, if a cell covering a supermarket area is cell A, when the new SIM card of user 1 is allocated a number, the information of cell A may be set in the SIM card. Certainly, if there are multiple cells (cell group) covering the area, a list of the group of cells in the SIM card may be set in the form of a Cell ID List.

(2) If the area information is not set when a new SIM card is allocated a number, the area information may be specifically set and stored at a certain time point after the number allocation of the SIM card according to the actual requirements of the users and the operators.

(3) When the particular service area updates the original developed services, the particular service information in the SIM card is updated. Under the circumstance of (3), the manner in which the information of the particular service area is updated in the SIM card may be: updating the present information of the particular service area in the SIM card by using an Over-the-Air (OTA) message. Herein, the OTA technology is the remote management technology for the data and application of the SIM card through an air interface of the mobile communications system. The air interface may use the Wireless Application Protocol (WAP), General Packet Radio Service (GPRS), CDMA1X and Short Message Service (SMS) technologies.

Moreover, when the particular service area needs to cancel the present service, the processing is similar to (3), which also may be completed by updating the information of the particular service area in the SIM card. The difference is that: when a new service is started, the information of the particular service area with the service in the SIM card needs to be added, and when a service is cancelled, the information of the particular service area with the service in the SIM card needs to be deleted.

It should be noted that, for the overall integrity of the method embodiment, steps 101 and 102 are described as steps. In fact, as the process of pre-analysis and presetting (pre-configuration), steps 101 and 102 may be completed at one time rather than executed every time for implementing the LBS.

Step 103: The UE reports its current location information to the SIM card when the service cell of the UE changes or the UE is powered on.

In this step, the UE may be notified by a command of the SIM card that the current location information of the UE needs to be reported if the location information of the UE changes or the UE is powered on. Specifically, the command may be a proactive command.

In addition, the change of the location information is the change of the location information at the cell level, for example, the change of a service cell. In general, a cell in which the UE is located is the service cell.

Step 104: The SIM card determines whether the UE is located in the particular service according to the location information reported by the UE, and if so, executes step 105.

In this step, the SIM card compares the location information reported by the UE with the preset particular service area information in the SIM card. If the location information reported by the UE to the SIM card is in accordance with that preset by the SIM card, it is determined that the UE is located in the cell of the particular service area (newly entered or powered on in the area). Otherwise, it is determined that the UE does not enter the particular service area and the process goes back to step 103. If the service cell of the UE changes or the UE is powered on next time, when current location information of the UE is reported to the SIM card, the determination in step 104 is carried out again.

For example, the SIM card compares the Cell ID in the location information reported by the UE with the Cell ID (or Cell ID List) preset in the SIM card. If the Cell ID reported by the UE matches that preset in the SIM card, it is determined that the UE enters the cell of the particular service area, and step 105 is executed.

Step 105: The SIM card commands the UE to send a service request to the application server.

In this step, because the UE located in the particular service area is determined, the SIM card fills the information representing that the UE enters (or is located in) the particular service area in the service request and commands the UE to send the service request; the process is transparent to the user. The UE sends the; service request according to the contents filled by the SIM card; the process is also transparent to the user.

Specifically, the information representing that the UE enters (or is located in) the particular service area may be current location information of the UE, such as the Cell ID information of a cell where the UE is currently located. The SIM card may command the UE to send the service request to the application server by a proactive command. The proactive command may be Send Short Message. In this way, after receiving the Send Short Message command of the SIM card, the UE sends the service request to the application server in the form of a short message, where the service request carries the Cell ID information of the cell where the UE is currently located.

Furthermore, it should be noted that, if the WCDMA is taken as an example, the service request sent by the UE is sent to an access system device on the network side through an air interface to a core network element such as a Mobile Switching Center (MSC), and finally, by the MSC, to the application server. The embodiments of the present disclosure do not describe this process in detail.

Step 106: The application server determines the particular service area where the UE is currently located according to the received service request and starts the corresponding service.

In this step, the application server receives the service request sent from step 105, determines which particular service area(s) the UE is currently located in according to the information, such as the Cell ID, in the service request, and starts the corresponding service.

The application server may be an information platform (including an advertisement (ad) application server and/or a public message server), an entertainment platform (including an entertainment multimedia message server) and the like, such as a Short Message Service Center (SMSC). Taking the ad application server of the information platform as an example, the ad application server may start the corresponding ad service for the particular user that enters the particular service area. Still taking user 1 as an example, the ad application server determines that user 1 enters a supermarket belonging to the particular service area of user 1, and starts the particular ad service for user 1.

The service, may be started in various ways, such as by short message, multimedia message, and paging.

It should be noted that, in this step, the application server may verify the service subscription of a user based on a subscription database and start a service for only the user that subscribes to the service. For example, assuming the application server is an SMSC, the subscription database stores information of the user that subscribes to the service of the application server. The subscription database may be in the SMSC or in other network elements, or be an independent subscription database. The service request sent by the UE may carry the ID of the UE, such as the International Mobile Subscriber Identity (IMSI) and Mobile Station International ISDN Number (MSISDN), so that the application server may find the ID of the UE sending the service request and verify the service subscription of the user according to the ID information of the user. The service started only for the user that subscribes to the service is implemented by the authentication.

Second Embodiment

Figure 2:
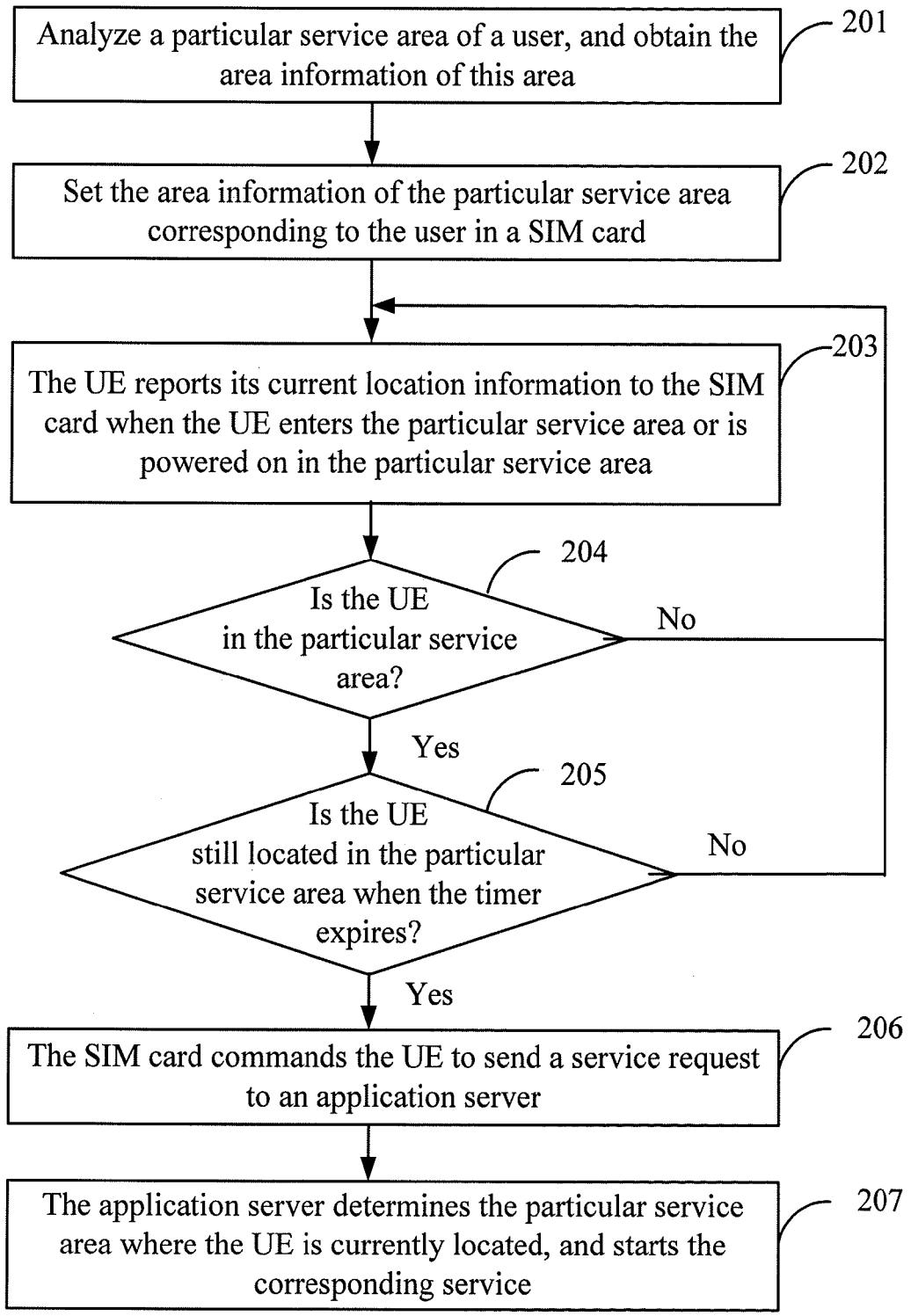
FIG. 2 illustrates a flowchart of a method for implementing the LBS provided by a second embodiment of the present disclosure.

FIG. 2 illustrates a flowchart of a method for implementing the LBS provided by the second embodiment of the present disclosure. As illustrated in FIG. 2, steps 201 to 204 are substantially the same as steps 101 to 104 in the first embodiment, and steps 206 to 207 are substantially the same as steps 105 to 106 in the first embodiment. This embodiment differs from the first embodiment in that: in step 204, when determining that the user enters the particular service area, the SIM card does not immediately trigger the UE to send a service request to the application server, but executes step 205 of setting a first timer for determination. If the timer expires, and the UE remains located in the particular service area, the SIM card commands the UE to send the service request to the application server. The duration of the timer may be flexibly set according to the operation requirement, for example, to two minutes. Before the timer expires, if the service cell of the UE does not change, the new current location information will not be reported to the SIM card and therefore, the SIM card determines that the UE remains located in the particular service area or, if the service cell of the UE changes, but the UE remains located in the cell of the particular area (in this case, the particular area covers multiple cells), the SIM card determines whether the new service cell of the UE remains in the particular service area according to the new current location information reported by the UE.

Before the timer expires, if the UE is out of the particular service area, the determination in step 204 is carried out when current location information of the UE is reported to the SIM card (step 203) next time if the service cell of the UE changes or the UE is powered on again.

Specifically, the way of setting the timer may be that: the SIM card registers an event of the timer with the UE by using the proactive command, for example, registering a Timer Management event with the UE. Before or when the timer expires, if the UE is out of the particular area, the SIM card may cancel the registration of the event of the timer with the UE.

The way of triggering the UE to send the service request to the application server by the SIM card has been described in detail above, thus needing no further description here.

In the technical solution provided by the embodiment, before the timer expires, if the UE is out of the particular service area, the SIM card cancels the registration of the event of the timer with the UE.

According to the technical solution provided by the embodiment, when a user enters the particular service area, a deferred starting mechanism may be used to avoid the particular service triggered by a user that occasionally passes by the particular service area. Meanwhile, the repeated sending of the service request to the application server caused by the continuous reselection due to a user located in the overlapped area may be further avoided.

Third Embodiment

The technical solution of the embodiment may be based on the first or second embodiment. In comparison with the first or second embodiment, the differences of the embodiment are as follows.

When commanding the UE to report a service request (step 105 in the first embodiment, and step 206 in the second embodiment), the SIM card may set a second timer to determine whether the UE has stayed in the particular service area for a sufficient time. It may be understood that, for the second embodiment, the second timer is independent of the first timer which is set when the SIM card determines that the user enters the particular service area. The duration of the second timer may be flexibly set according to the operation requirement. For example, the duration may be set to two minutes.

When the second timer expires, if the SIM card determines that the UE (corresponding user) has already stayed in the particular service area for a certain time (see the second embodiment for the way of determination), the SIM card again proactively triggers the UE to report the service request, namely, the SIM card again requests the service provided by application server corresponding to the particular service area. Therefore, if the service in the application server has been updated, the application server may provide the updated service contents to the UE, so that the UE may obtain the latest service contents in time.

In the technical solution provided by the embodiment, before the timer expires, if the UE is out of the particular service area, the SIM card cancels the registration of the event of the timer with the UE, and does not request the service provided by the application server corresponding to the original particular service area.

The ways of specifically setting the timer and sending the service request have been described in detail in the above embodiments, thus needing no further description.

In the technical solution provided by the embodiment, when the user stays in the particular service area for a long time (e.g., over two minutes), a timed update of the service may be implemented by setting the timer to enable the user to obtain the latest service contents in time.

Fourth Embodiment

The embodiment may be based on the first, second or third embodiment. In comparison with the first, second or third embodiment, the differences of the embodiment are as follows:

The SIM card may further request equipment information from the UE, such as the International Mobile Station Equipment Identity (IMEI). Therefore, when the SIM card finds that the UE enters the particular service area and commands the UE to report a service request, the service request may further include the IMEI. Therefore, the application server may exactly determine the type of the UE according to the IMEI to organize the sending of different adaptive information of the UE with respect to the type.

The aforementioned adaptive information may be the format of the service sent to the UE. For example, the service is sent by using the format, such as short message or multimedia message, according to the factors, such as the format and screen size, supported by the UEs of different types. Furthermore, according to the type of the UE, the multimedia message may further include an MPEG Layer 3 (MP3) audio and a Musical Instrument Digital Interface (MIDI) ring tone. In other words, when using the same service, because of different types of the UEs, the service may be sent by the application server in different formats to different UEs. By doing so, the service may be sent according to the specific types of UEs.

Specifically, because the IMEI may carry the Type Approval Code (TAC) that identifies the UE type, the application server may determine the UE type according to the TAC.

Specifically, the way of requesting equipment information from the UE by the SIM card may include: the SIM card requests the IMEI information from the UE through the proactive command which, for example, may be Provide Local Information. After receiving the command, the UE sends its equipment information to the SIM card.

Fifth Embodiment

The embodiment may be based on any one of the first to the fourth embodiments, and further include the following technical features in comparison with any one of the first to the fourth embodiments.

The application server may store a bill record of the UE. After the UE sends a service request, the application server determines whether the UE has obtained the service of the particular service area by searching the bill record. If the UE has obtained a service which is the same as that provided by the particular service area, the service will not be sent to the UE repeatedly. In this way, the resource waste may be avoided in the case that the UE has obtained the service.

As described above, the technical solution provided by the embodiments of the present disclosure may be further applicable to the UE in the connection state. For the UE in the connection state, the implementation by using the toolkit function of the SIM card is substantially the same as the method embodiments above.

As aforementioned, besides the implementation by using the toolkit function of the SIM card, the embodiments of the present disclosure further provide a technical solution for implementing the LBS by using the location update function. The above technical solution is described by the following method embodiment taking the UE in the idle state as an example.

Sixth Embodiment

Figure 3:
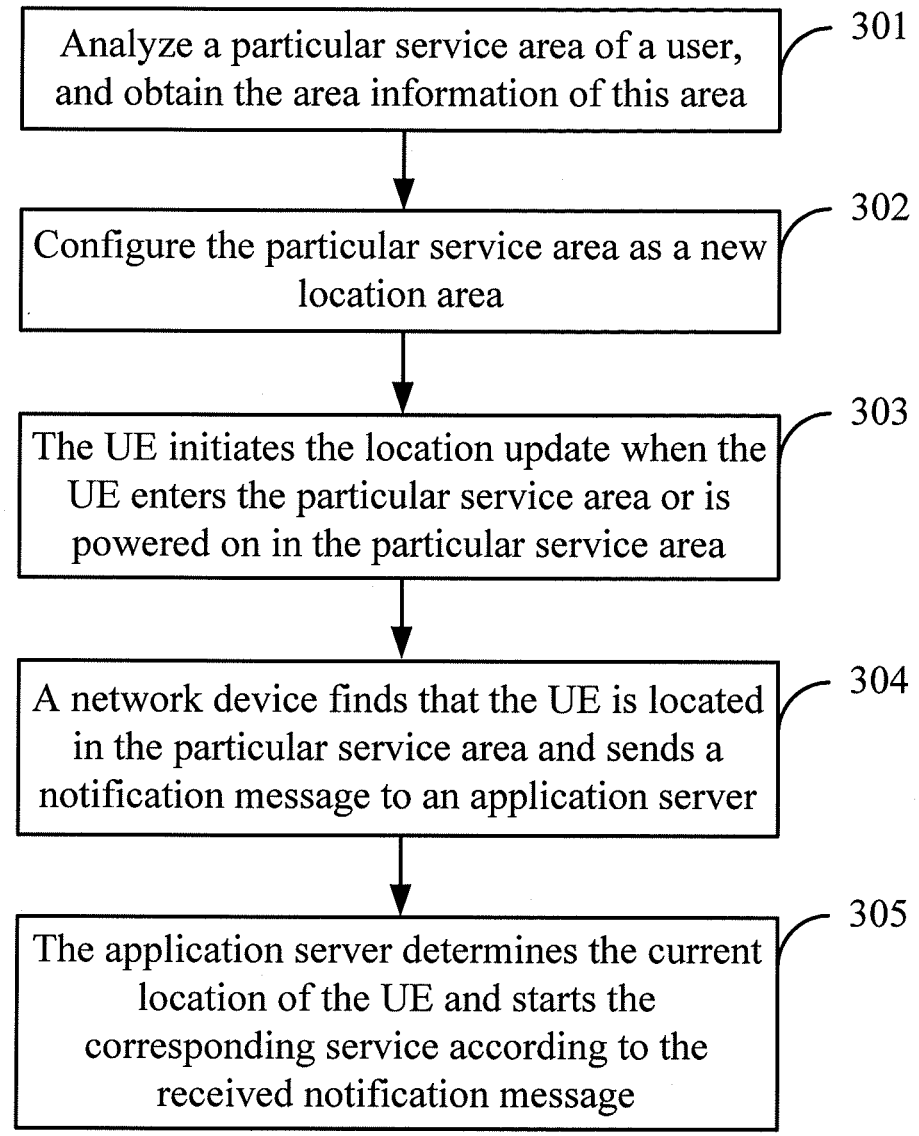
FIG. 3 illustrates a flowchart of a method for implementing the LBS provided by a sixth embodiment of the present disclosure.

FIG. 3 illustrates a flowchart of a method for implementing the LBS provided by the sixth embodiment of the present disclosure. As illustrated in FIG. 3, the method of the sixth embodiment includes the following steps:

Step 301: Analyze a particular service area of the user, and obtain the area information of this area.

Step 302: Configure the particular service area as a new location area.

The location area here is a defined area managed by one or more base stations (such as a Base Transceiver Station (BTS)), in which the UE may move freely without notifying the system. The location area may consist of one or more cells and be controlled by one or more Base Station Controllers (BSCs), but only belong to one MSC. When the UE moves in a network, the network needs to track the location of the UE. To enable the network to keep track of the current location of the UE, the UE needs to notify the system when changing the location area. This process is called as a location update. The location update falls into four types: (1) normal location update: the location update of a UE entering a new location area; (2) IMSI attach: the location update when a user powers on a UE; (3) IMSI detach: the location update when the user powers off the UE or takes the SIM card out; and (4) periodic location registration: the periodic location registration from the UE to the network, ranging from 0 to 225.

In this step, the implementation may be directly planned during the early stage of the network construction or reconfigured independently of the original networking planning during the network operation.

It should be noted that, for the overall integrity of the method embodiment, steps 301 and 302 are described as steps. In fact, as the process of pre-analysis and presetting (pre-configuration), steps 301 and 302 may be completed at one time, rather than executed every time for implementing the LBS.

Step 303: The UE initiates the location update when the UE enters the particular service area or when the UE is powered on in the particular service area.

In this step, the UE initiates the location update during which the new location area information is notified to a system device on the network side.

The embodiments of the present disclosure focus on the location updates (1) and (2) in which the system device on the network side may find that the UE is located in the particular service area.

The particular service area is configured as an independent location area. Therefore the location update will be initiated when the UE enters the particular service area. In addition, if the UE is powered on in the particular service area, the location update will also be initiated. At this moment, the system device on the network side finds that the UE enters the particular service area according to the location update of the UE and sends a notification message to the application server. In this step, the system device on the network side may be an MSC.

Step 304: The system device on the network side sends the notification message to the application server when the system device on the network side finds that the UE is located in the particular service area.

In this step, the system device on the network side may send the notification message to the application server through a Common Object Request Broker Architecture (CORBA) interface. The notification message may include current location information of the UE, such as the information of the cell where the UE is currently located, specifically, the Cell ID information.

Step 305: The application server determines the current location of the UE and starts the corresponding service according to the received notification message.

The application server determines the current location of the UE according to current location information of the UE in the received notification message and starts the corresponding service. The step of determining the current location of the UE and starting the corresponding service is similar to the corresponding implementation of the embodiments above, thus needing no further description here.

Furthermore, when the UE located in the particular service area is determined, the system device on the network side may set a third timer to delay for a while rather than trigger and start the service immediately. If the third timer expires and the UE remains located in the particular service area (during which the UE does not initiate the location update in a new location area), the system device on the network side triggers and starts the service. If before the timer expires, the UE initiates the location update in the new location area, this indicates that the UE has been out of the original particular service area. By doing so, the particular service initiated by a user occasionally passing by the particular service area may be avoided.

Moreover, if the UE stays in the particular service area for a long time, the periodic location update may be carried out according to the mechanism in the prior art. During the periodic location update, the system device on the network side may notify the application server. If the application server has a service to be updated, the service content update is started to implement the timed service update function, so that the UE can obtain the latest service in time.

In addition, the application server may store the bill record. After the UE sends a service request, the application server determines whether the UE has obtained the service of the particular service area by searching the bill record. If the UE has obtained a service which is the same as that provided by the particular service area, the service will not be sent to the UE repeatedly to avoid the resource waste.

As described above, if the location update is implemented, the technical solution provided by the embodiments of the present disclosure may be also applicable to the UE in the connection state. For example, if the UE does not have a Circuit Switched (CS) connection, the implementation thereof is substantially the same as that of the embodiment based on the location update.

Figure 4:
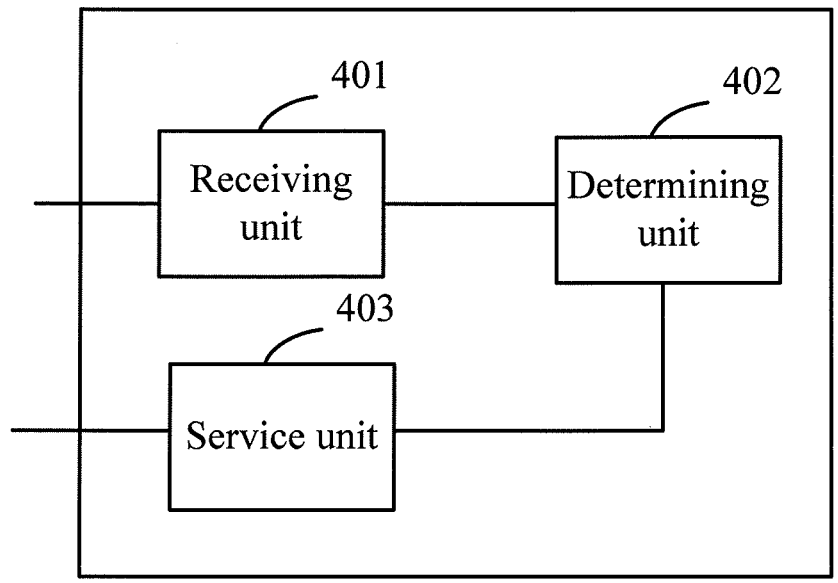
FIG. 4 illustrates a structure diagram of a device for implementing the LBS in a communications system in an embodiment of the present disclosure.

The embodiments of the present disclosure further provide a device for implementing the LBS in a communications system to provide the service for a UE in the particular service area. For example, the device may be an application server. FIG. 4 illustrates a structure diagram of the device. As illustrated in FIG. 4, the device includes a receiving unit 401 configured to receive current location information of the UE, where the current location information is sent when the UE enters the particular service area or when the UE is powered on in the particular service area, a determining unit 402 configured to determine the particular service area where the UE is currently located according to the current location information of the UE received by the receiving unit, and a service unit 403 configured to start the service corresponding to the UE according to the determination result of the determining unit.

The device may further include a database unit configured to store the information of the UE that subscribes to the service provided by the device. Correspondingly, the determining unit 402 is further configured to determine whether the UE corresponding to the information received by the receiving unit subscribes to the service provided by the device according to the information stored in the database unit.

The device may further include a bill record storing unit configured to store the bill record of the UE. So, after the UE sends a service request, the application server determines whether the UE has obtained the service of the particular service area by searching the bill record. If the UE has obtained a service which is the same as that provided by the particular service area, the service will not be sent to the user repeatedly.

Figure 5:
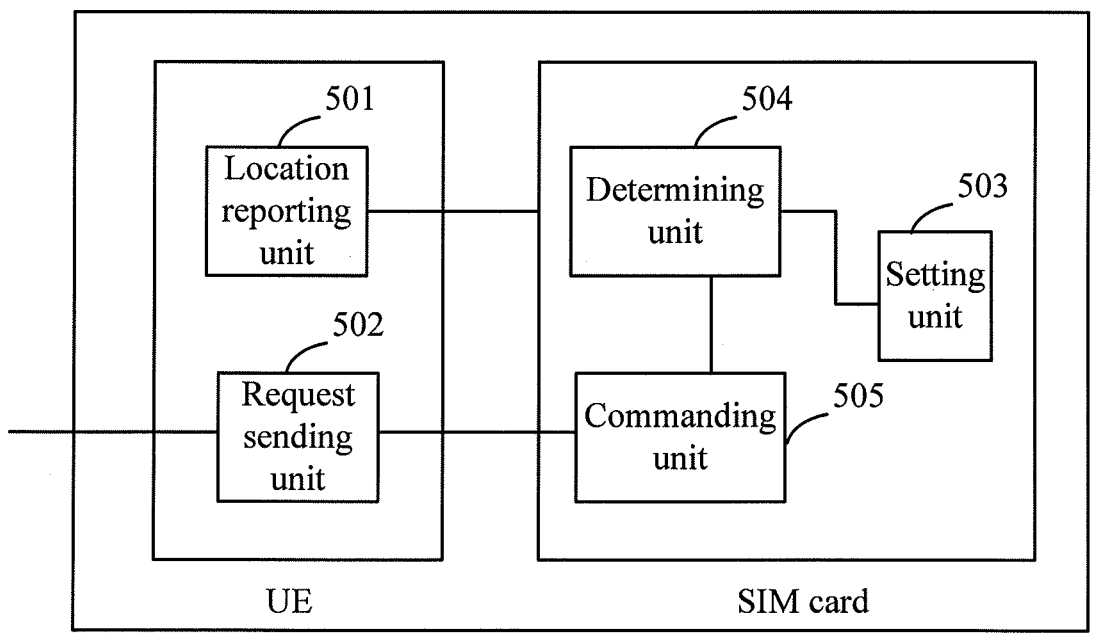
FIG. 5 illustrates a structure of an MS in a communications system in an embodiment of the present disclosure.

The embodiments of the present disclosure further provide a Mobile Station (MS) in a communications system. The MS includes a SIM card and a UE. FIG. 5 illustrates a structure diagram of the MS. As illustrated, the UE includes: a location reporting unit 501 and a request sending unit 502, and the SIM card includes: a setting unit 503, a determining unit 504, and a commanding unit 505.

Specifically, the setting unit 503 of the SIM card is configured to set the area information of the particular service area of UE. The location reporting unit 501 of the UE is configured to report current location information of the UE to the SIM card, when the service cell of the UE changes or the UE is powered on. The determining unit 504 of the SIM card is configured to determine whether the UE is located in a cell of the particular service area according to the current location information reported by the UE. The commanding unit 505 of the SIM card is configured to command the UE to send a service request to the application server when the determining unit determines that the UE is located in a cell of the particular service area. The request sending unit 502 of the UE is configured to send the service request carrying current location information of the UE to the application server after the command of the SIM card is received.

The determining unit of the SIM card further includes a first timing processing subunit configured to set the first timer and trigger the commanding unit 505 to command the UE to send a service request to the application server if the first timer expires and the UE remains located in the particular service area.

The embodiments of the present disclosure further provide a system for implementing the LBS. The system includes the above device for implementing the LBS and the MS in a communications system.

The technical effect of the technical solution provided by the embodiments of the present disclosure has been described in the method embodiments in detail, thus needing no further description.

Those skilled in the art may understand that all or some steps in the method embodiments may be implemented by a program instructing the corresponding hardware. The program may be stored in a computer readable storage medium. When executed, the program includes at least one of the steps in the method embodiments.

In addition, each functional unit in each embodiment of the present disclosure may be integrated in a processing module, or be physically independent. Or two or more units are integrated in a module. The integrated module above may be implemented by hardware or by a software functional module. The integrated module implemented by the software functional module and sold or used as an independent product may be stored in a computer readable storage medium also.

The aforementioned storage medium may be a Read Only Memory (ROM), a magnetic disk or a Compact Disk-Read Only Memory (CD-ROM).

Although the present disclosure has be illustrated and described with reference to some preferred embodiments thereof, those skilled in the art should understand that various modifications of the present disclosure in form and detail are allowed and fall within the scope of the present disclosure.

What is claimed is:

1. A method for implementing a Location-Based Service (LBS), wherein a corresponding particular service area is set for a User Equipment (UE) and services in the particular service area are provided by a corresponding application server, comprising:

receiving current location information sent by the UE, as soon as the UE enters the particular service area or as soon as the UE is powered on in the particular service area;

determining the particular service area of where the UE is currently located according to the current location information sent by the UE;

if it is determined that the UE is currently located in the particular service area, determining whether the UE has already obtained a service of the particular service area by searching a billing record of the UE; and if it is determined that the UE has not yet obtained the service of the particular service area, starting a service corresponding to the UE according to the current particular service area where the UE is currently located.

2. The method according to claim 1, wherein the setting of the particular area as the particular service area of the user comprising:

setting an area information of the particular service area in a Subscriber Identity Module (SIM) card, the particular area information comprises:

a Cell Identification (ID) covering the particular service area; or the Cell ID covering the particular service area and at least one of a Mobile Country Code (MCC), a Mobile Network Code (MNC) or a Location Area Code (LAC).

3. The method according to claim 2, wherein the step of receiving the current location information of the UE comprising:

reporting by the UE, the current location information of the UE to the SIM card when a service cell of the UE changes or the UE is powered on;

determining by the SIM card, whether the UE is located in the cell of the particular service area according to the current location information reported by the UE, wherein if it determined that the UE is located in the cell of the particular service area, commanding by the SIM card, the UE to send a service request to the application server, and the service request comprises the current location information of the UE; and receiving by the application server, the service request sent by the UE and obtaining the current location information of the UE from the service request.

4. The method according to claim 3, wherein the step of commanding the UE to send the service request to the application server comprising:

filling by the SIM card, the current location information of the UE in the service request and commanding the UE to send the information.

5. The method according to claim 3, wherein the service request further comprises equipment information of the UE, and the method further comprising:

determining by the application server, a type of the UE according to the equipment information of the UE and using a corresponding format according to the type of the UE when sending the service.

6. The method according to claim 2, further comprising:

storing by the application server, the bill record of the UE, and if it is determined that the UE has obtained the service of the particular service area, not sending the service to the UE repeatedly.

7. The method according to claim 2, wherein after the SIM card determines that the UE has already entered the particular service area, the method further comprising:

setting a first timer, and if the first timer expires and the UE remains located in the particular service area, commanding the UE to send the service request to the application server.

8. The method according to claim 7, wherein after the SIM card commands the UE to send the service request, the method further comprising:

setting a second timer; and if the second timer expires, commanding the UE to resend the service request to the application server.

9. The method according to claim 1, wherein the particular service area is located in an independent location area, providing a particular service area information which comprises:

a Cell ID covering the particular service area; or a Cell ID covering the particular service area and at least one of a Mobile Country Code (MCC), a Mobile Network Code (MNC), or a Location Area Code (LAC).

10. The method according to claim 9, wherein the step of receiving the current location information of the UE comprising:

sending by a system device on a network side, a notification message to the application server, the notification message comprising the current location information of the UE when the system device on the network side finds that the UE is located in the particular service area if it is determined that the UE has initiated a location update to the system device on network side as soon as the UE enters the particular service area or as soon as the UE is powered on in the particular service area; and receiving by the application server, the notification request and obtaining the current location information of the UE from the notification request.

11. The method according to claim 10, after the system device on the network side finds that the UE is located in the particular service area, further comprising:

setting a timer, and if it is determined that the timer has expired and the UE remains located in the particular service area, sending the notification message to the application server.

12. A device for implementing a Location-Based Service (LBS) in a communications system, wherein the device provides a service for a User Equipment (UE) located in a particular service area, the device comprising:

a receiving unit configured to receive current location information of the UE, wherein the current location information is sent by the UE as soon as the UE enters the particular service area or as soon as the UE is powered on in the particular service area;

a determining unit configured to determine the particular service area of where the UE is currently located according to the current location information of the UE received by the receiving unit;

a database unit configured to store information of the UE that subscribes to the service provided by the device, wherein if the determining unit determines that the UE is currently located in the particular service area, the determining unit is further configured to determine whether the UE has obtained a service of the particular service area by searching the information stored in the database unit; and a service unit configured to start a service corresponding to the UE if the UE has not obtained the service of the particular service area.

13. The device according to claim 12, wherein the information stored in the database unit is a billing record of the UE.

* * * * *